April 12, 1932.   J. BUHOLZER   1,854,102

PHOTOGRAPHIC FILM

Filed Jan. 22, 1930

Joseph Buholzer
INVENTOR

BY Victor J. Evans
ATTORNEY

Patented Apr. 12, 1932

1,854,102

UNITED STATES PATENT OFFICE

JOSEPH BUHOLZER, OF NUEVA GERONA, ISLA DE PINOS, CUBA, ASSIGNOR OF ONE-FIFTH TO PAUL JOHN HUTTENLOCHER, OF NUEVA GERONA, ISLA DE PINOS, CUBA

PHOTOGRAPHIC FILM

Application filed January 22, 1930. Serial No. 422,636.

This invention relates to a photographic film, the general object of the invention being to provide means whereby the exposed section or sections of the film can be separated from the other sections so that the exposed sections can be developed without exposing all the sections of the film and the unexposed sections can be relaced in the camera and exposed in the ordinary manner.

The present invention is designed for use with the camera forming the subject matter of an application filed on or about January 22, 1930 and bearing Serial No. 422,637.

This invention also consists in certain other features of construction and in the combination and arrangement of the several parts, to be hereinafter fully described, illustrated in the accompanying drawings, and specifically pointed out in the appended claims.

In describing the invention in detail, reference will be had to the accompanying drawings wherein like characters denote like or corresponding parts throughout the several views, and in which:—

In these views, the numeral 1 indicates the backing strip and the numeral 2 the film strip. The spools on which the strips are wound are shown at 3 and in order to firmly attach the backing strip to each spool, I provide the ends of the strip with the flaps 4 which are folded over each end of the strip and then the end is passed through the slot in the spool, after which the flaps are unfolded and pressed against the spool so that the flaps lock the end of the strip to the spool. The front end of the backing strip is formed with a transparent part 5 which is spaced a sufficient distance from the front end of the film to eliminate any danger of the light rays passing through the transparent part reaching the film. This transparent part acts as a ground glass for ascertaining when the camera is properly focussed when the film is used with the camera forming the subject matter of the before mentioned application.

Figure 4:
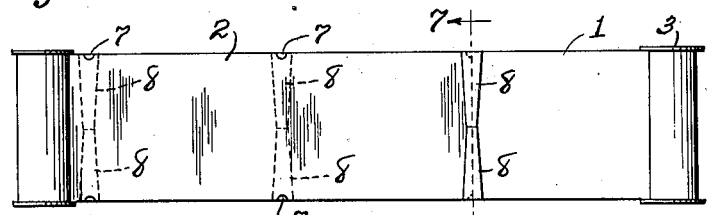
Figure 4 is a view similar to Figure 3, but showing the tabs folded over the free end of the film.
Figure 5:
Figure 5 is a section on line 5—5 of Figure 1.
Figure 7:
Figure 7 is a section on line 7—7 of Figure 4.
Figure 6:
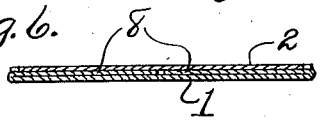
Figure 6 is a section on line 6—6 of Figure 3.

The edges of the film strip 2 are notched as at 7, to indicate where the film is to be cut to separate one section of the film from another. A tab 8 is formed opposite each notch on the backing strip 1, these tabs normally occupying a folded position under the film, as shown in dotted lines in the drawings. The inner faces of the tabs are provided with adhesive material and these tabs are adapted to be folded over the free end of the film strip after one or more exposed sections have been cut therefrom, so as to fasten the free end to the backing strip, as shown in Figures 4 and 7.

Figure 1:
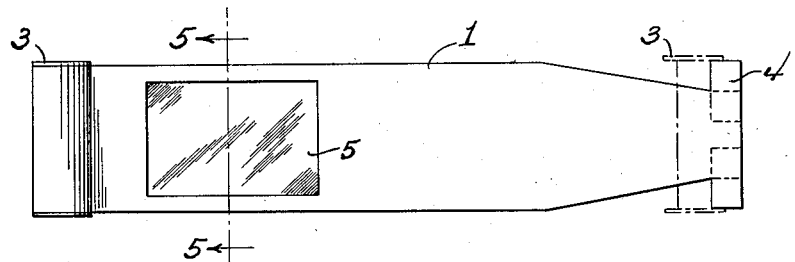
Figure 1 is a view showing the film and its backing partly wound on a spool, this figure showing in dotted lines how an end of the backing is connected with a spool.
Figure 2:
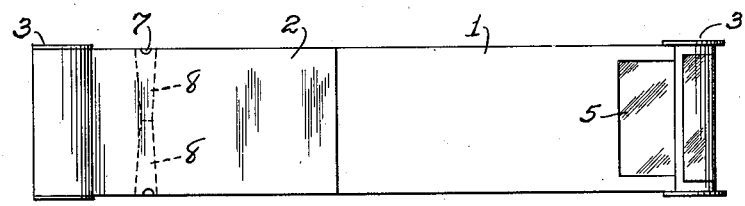
Figure 2 is a view showing the backing partly wound on both spools, with a portion of the film strip exposed.
Figure 3:
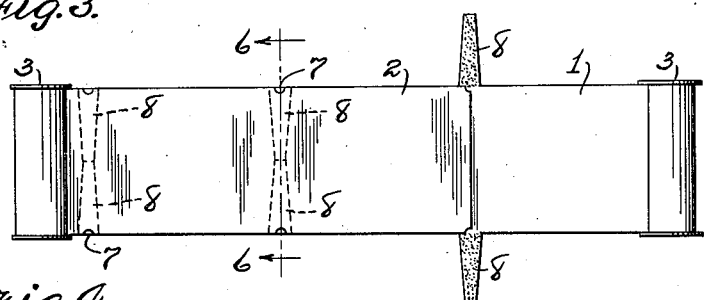
Figure 3 is a view similar to Figure 2, but showing an exposed section of the film cut from the rest of the film and the tabs ready to be folded over on the free end of the remaining portion of the film.

From the foregoing it will be seen that after one or more exposures have been made and it is desired to develop the exposed portions without waiting for the entire film to be exposed, the film is taken from the camera and, of course, this should be done in a dark room. The exposed section or sections are then cut from the unexposed portion of the film and the two tabs in alignment with the cut are unfolded and then folded over the free end of the film, as shown in Figures 4, 3 and 7, so that these tabs will fasten the free end of the film to the backing strip. The film is then replaced in the camera and the spools adjusted to bring the next section to be exposed into exposing position. This adjustment of the film will be facilitated if the handle devices for the spools, shown in the before mentioned application, are used.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a photographic film, a backing strip having opposed tabs at opposite edges thereof and provided with gummed surfaces, a film strip superimposed relative to the backing strip, with the tabs normally therebetween, said tabs being adapted to overhang and attach the film strip to the backing strip when a portion of said film strip has been cut therefrom and the tabs extracted from between said strips, the film strip being notched at points coinciding with the tabs and indicative of separation points for portions of said film strip.

2. In a photographic film, a backing strip having opposed tabs at opposite edges thereof and provided with gummed surfaces, a film strip superimposed relative to the backing strip, with the tabs normally therebetween, said tabs being adapted to overhang and attach the film strip to the backing strip when a portion of said film strip has been cut therefrom and the tabs extracted from between said strips, the film strip being notched at points coinciding with the tabs and indicative of separation points for portions of said film strip, and a focussing area formed in the backing strip and beyond the location of the film strip.

In testimony whereof I affix my signature.

JOSEPH BUHOLZER.